Oct. 30, 1951 J. A. RANKIN ET AL 2,573,274
FREQUENCY MODULATION CIRCUIT
Original Filed Aug. 2, 1943
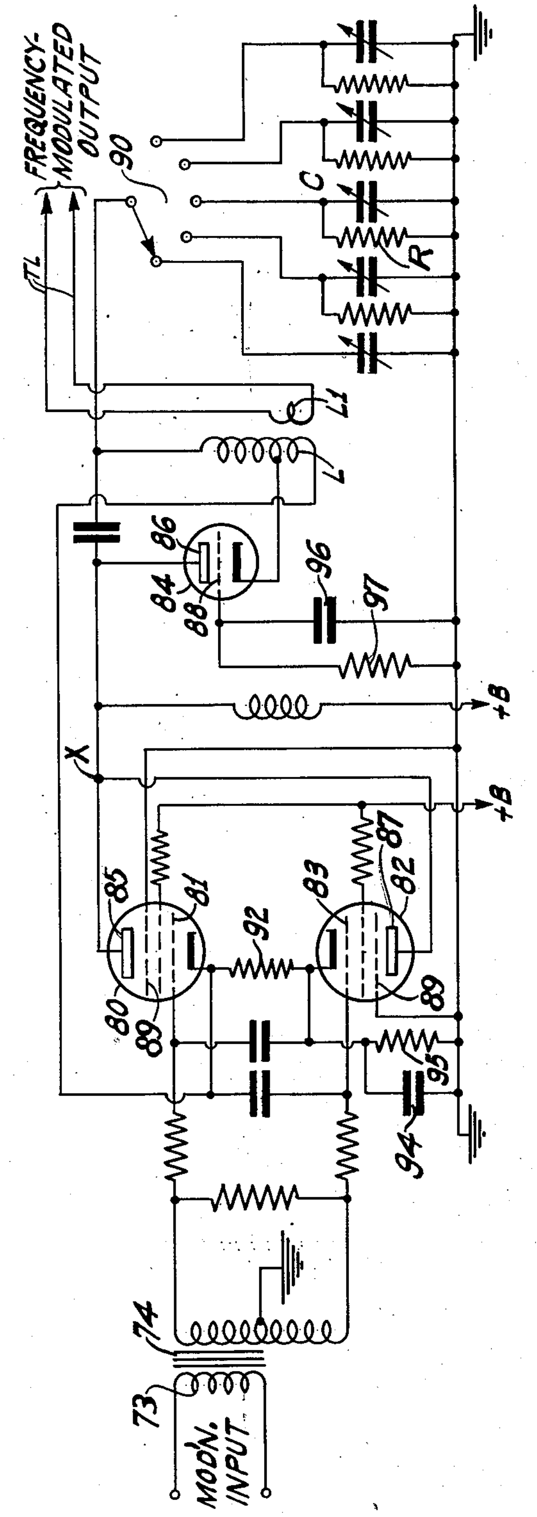
INVENTORS
JOHN A. RANKIN,
HARMON B. DEAL AND
WILLIAM R. ALEXANDER
BY Harry Tunick
ATTORNEY Patented Oct. 30, 1951

2,573,274

UNITED STATES PATENT OFFICE 2,573,274

FREQUENCY MODULATION CIRCUIT

John A. Rankin, Chicago, Ill., and William R. Alexander, Upper Montclair, and Harmon B. Deal, Glen Ridge, N. J., assignors to Radio Corporation of America, a corporation of Delaware Original application August 2, 1943, Serial No. 497,000. Divided and this application October 31, 1949, Serial No. 129,946

4 Claims. (Cl. 250—40)

This application is a division of our copending application, Serial No. 497,000, filed August 2, 1943, which ripened on April 25, 1950, into Patent #2,505,574.

This invention relates to frequency modulation, and more particularly to frequency modulation transmitters.

An object of this invention is to devise a novel variable reactance circuit which is particularly useful for frequency modulation of an oscillator.

Another object is to provide a variable reactance type of circuit which is rather simple yet highly effective.

Other objects to be attained and other advantages which flow from the attainment of such objects appear in the detailed description which follows.

In describing this invention in detail reference will be made to the accompanying drawing, wherein the single figure is a detailed diagram of the variable reactance circuit of this invention.

The objects of this invention are accomplished, briefly, in the following manner:

Two reactance tubes are provided, and these tubes are supplied with alternating voltages in such a way that in each tube there is a phase quadrature relation between the anode and grid voltages. In one tube the grid voltage leads the anode voltage so that the tube is in effect a capacitance, while in the other tube the grid voltage lags the anode voltage so that the tube is in effect an inductance. These two tubes are connected to, and supplied from, the tank circuit of an oscillator. Differential modulation of the two tubes reduces the capacitive reactance and the inductive reactance simultaneously and vice versa to produce corresponding changes in the oscillator tank circuit and to change the frequency of the oscillations generated.

Now referring to the drawing, the primary winding 73 of the modulation input transformer 74 is supplied with any desired form of modulating voltage. For example, the modulating voltage may be of the form of pulsed audio frequency, which may be supplied from an audio oscillator through pulsing apparatus, as disclosed in the aforesaid copending parent application.

The output of transformer 74 is fed differentially to the control electrodes 81 and 83 of the push-pull reactance tubes 80 and 82 which as connected control the timing of the oscillatory energy generated in tube 84. The tube 84 has its anode 86 and grid 88 coupled in a Hartley oscillator of the grounded grid type. This intermediate frequency (IF) oscillator is tuned by a selected one of five capacitors C put in shunt to inductance L by the IF selector switch 90 which is connected to one end of inductance L, the opposite end of such inductance being grounded through resistor 92 and condenser 94. The capacitors C are shunted by loading resistances R to maintain constant output over the tuning range. Frequency stability over the range is provided by using zero drift condensers C and voltage regulator tubes in the direct current supply to the anodes 85, 87 and 86, respectively of tubes 80, 82 and 84, and the screening electrodes 89 of tubes 80 and 82. No other circuit compensation is needed. There are five capacitors adapted to be switched into the circuit LC so that the intermediate frequency oscillator may operate at any one of five frequencies, depending upon the position of the IF selector switch 90.

The anode 86 of the oscillator 84 and one end of inductance L are coupled to the anodes of the tubes 80 and 82 at point X so that generated voltages of like phase appear on these anodes. The other end of the inductance L is connected through the cathode resistor 92 of tubes 80 and 82 and coupling condenser 94 to ground and thence to the lower terminal of the condenser C. The grid electrode 88 is coupled to ground by a bias resistance 97 shunted by coupling condenser 96.

If we consider the tank circuit L, resistance 92, (the bias resistance 95 shunted by condenser 94 may be disregarded) ground, and condenser C, we will see that if we assume the potential at the upper end of inductance L and the anodes of tubes 80 and 82 is of a first phase, the phase of the potentials of the generated frequency at one end of the resistance 92 will be advanced 90° with respect to said first phase, while the phase of the generated voltage at the other end of the resistance 92 will be retarded 90° with respect to said first phase.

In this network, both ends of the bias resistance 95 and condenser 94 may be considered at ground radio frequency potential. This is permissible because condenser 94 is large enough to be considered a short circuit at the generated frequency. (In one embodiment condenser 94 is 25 mfd. and bias resistance 95 is 390 ohms). The generated voltage of said first phase at point X is applied to the anodes of both tubes 80 and 82. The alternating current path for tube 82 may be considered from point X through inductance L, the resistance 92 (in one embodiment 22 ohms), the cathode of tube 82, and back to X. The current through this network is reactive, so that there is a potential drop through resistance 92 which is displaced about 90° at the cathode of 82. This voltage is also applied to the grid 81 of tube 80. The alternating current path for tube 80 may be considered from the point X through condenser C, the resistance 92, the cathode of tube 80, and back to point X. This current is also reactive, but the reactance is of opposite sign, so that the potential drop caused thereby in resistance 92 is displaced in phase about 90° in the other direction at the cathode of tube 80. This voltage is also applied to the grid 83 of tube 82. Thus we have in both tubes 80 and 82 a phase quadrature relation between the anode and grid voltages. In one tube the grid voltage leads the anode voltage so that the current in the tube to the anode leads the anode voltage and the tube is in effect a capacity in the tank circuit. In the other tube the grid voltage lags the anode voltage so that the current in the tube lags the anode voltage and the tube is in effect an inductance in the tank circuit. The positions of the inductance L and condenser C may be interchanged, thus interchanging the effective reactances presented to the respective tubes in the tank circuit.

Differential modulation of the tubes by potentials from the transformer 74 then will reduce the capacitive reactance and the inductive reactance simultaneously and vice versa to change the frequency of the intermediate frequency oscillations generated.

The timing modulated or frequency modulated intermediate frequency energy is fed from inductance L to a low impedance inductance L1 coupled thereto and thence in substantially push-pull fashion by lines TL to a suitable utilization circuit, such, for example, as that disclosed in our aforementioned copending application.

Oscillator drift due to aging in the modulator tubes 80 and 82 is inherently compensated in the push-pull circuit described above.

We claim:

1. In a variable reactance: an inductance, a capacitor and a resistor in series, two electron discharge devices each having an anode, a cathode and a control grid, means connecting the two anodes together and to the junction point of said inductance and capacitor, means connecting the two cathodes respectively to the ends of said resistor, means connecting the control grid of the first device to the cathode of the second device, means connecting the control grid of the second device to the cathode of the first device, and connections for applying alternating current to said junction point, whereby the device impedances simulate reactances of opposite sign.

2. An electrical system comprising a variable reactance as recited in claim 1 with connections for controlling the conductivities of the devices to correspondingly vary the simulated reactances.

3. In apparatus for tuning an alternating current circuit: a reactance wherein alternating current flows, a reactance of sign opposite to that of the first-named reactance and also an impedance in series with said first-named reactance, two electron discharge devices each having an anode electrode, a cathode and a control grid, means connecting the two anode electrodes together and to the junction point of said two reactances, means connecting the two cathodes respectively to the ends of said impedance, means connecting the control grid of the first device to the cathode of the second device, and means connecting the control grid of the second device to the cathode of the first device, whereby the devices simulate reactances in said alternating current circuit for tuning the same.

4. An electrical system comprising circuit tuning apparatus as recited in claim 3 with means for controlling the conductivities of the devices to correspondingly vary the simulated reactances and the tuning of the alternating current circuit.

JOHN A. RANKIN.
WILLIAM R. ALEXANDER.
HARMON B. DEAL.

REFERENCES CITED

The following references are of record in the file of this patent:

UNITED STATES PATENTS

| Number | Name | Date |
|---|---|---|
| 2,160,466 | Usselman | May 30, 1939 |
| 2,169,859 | Usselman | Aug. 15, 1939 |
| 2,430,126 | Korman | Nov. 4, 1947 |